United States Patent
Miller (10) Patent No.: US 6,296,431 B1
(45) Date of Patent: *Oct. 2, 2001

(54) SELF-CONTAINED FASTENER DEVICE

(75) Inventor: Richard Virgil Miller, North Richland Hill, TX (US)

(73) Assignee: Nissi Industrial Technology, Inc., Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/440,249

(22) Filed: Nov. 15, 1999

Related U.S. Application Data (60) Provisional application No. 60/108,511, filed on Nov. 16, 1998.

(51) Int. Cl.[7] ............................. F16B 21/18; F16B 39/00
(52) U.S. Cl. ........................ 411/353; 411/107; 411/178; 411/389
(58) Field of Search ................................. 411/107, 108, 411/352, 353, 389, 178, 999

(56) References Cited

U.S. PATENT DOCUMENTS

| | | | |
|---|---|---|---|
| 2,992,685 | 7/1961 | Madsen | 170/159 |
| 3,124,190 | 3/1964 | Cornell . | |
| 3,250,559 | * 5/1966 | Sommerfeld | 411/352 |
| 3,578,799 | 5/1971 | Davis | 269/51 |
| 3,683,988 | 8/1972 | Carter et al. . | |
| 4,396,327 | * 8/1983 | Menke | 411/107 X |
| 5,338,139 | * 8/1994 | Swanstrom | 411/353 |
| 5,462,395 | * 10/1995 | Damm et al. | 411/353 |
| 6,095,736 | * 8/2000 | Miller et al. | 411/107 X |

OTHER PUBLICATIONS

Vought drawing date unknown.
Boeing drawing "Back–Bolt Assembly," Dec. 13, 1993, maybe earlier.
Vought Aircraft Compnay drawling, Jan. 4, 1994, maybe earlier.

\* cited by examiner

Primary Examiner—Neill Wilson
(74) Attorney, Agent, or Firm—Max Ciccarelli; Robert C. Hilton; Thompson & Knight L.L.P.

(57) ABSTRACT

The present invention is for a fastener device used to releasably fasten a first object and a second object. The fastener device is self-contained and includes a unitary housing that is releasably fastened to the first object. The housing has an annular wall that defines an exterior surface, an interior surface, and an upper and lower opening. Within the housing, extending radially inwardly from the interior surface is a housing stop shoulder. A retaining cover is threadingly attached to the housing at the lower end of the housing. The retaining cover is retained within the housing by a retainer ring.

The fastener device also includes a threaded stud that is located within the housing. The stud includes an enlarged section which mates with the housing stop shoulder when the fastener is in a fully engaged position. The engagement of the enlarged section and the housing stop shoulder serves to retain the stud within the housing when the fastener is in a fully engaged position. When the fastener is in a disengaged position, the stud is adapted to engage the retaining cover. As the stud is rotated, it ceases engagement with the retaining cover, and the stud is biased upward by a spring until the stud contacts the second object. The stud is again rotated so that the threads on the stud engage the second object, thereby attaching the first object to the second object.

19 Claims, 5 Drawing Sheets

SELF-CONTAINED FASTENER DEVICE

This application claims the benefit of U.S. Provisional Application No. 60/108,511, filed Nov. 16, 1998, which is hereby incorporated by reference.

BACKGROUND OF THE INVENTION

1. Field of the Invention

This invention relates in general to fastener devices and in particular to a self-contained fastener device which can releasably fasten itself to one of the two components being fastened and which can releasably fasten the two components together.

2. Description of Related Art

In many diverse fastening operations in which two components are being secured one to the other, it is desirable to have a fastener device which can be releasably secured to one of the two components, and which can releasably secure the two components one to the other. U.S. Pat. No. 2,992,685 (Madsen), U.S. Pat. No. 3,124,190 (Cornell), U.S. Pat. No. 3,578,799 (Davis), and U.S. Pat. No. 3,683,988 (Carter) show some of the existing fasteners of this type and some of the common applications.

Although there exist fasteners of this type that are self-contained—in other words whose component parts are retained together upon unfastening—such existing fasteners are generally bulky and unduly complicated. Smaller, more compact fasteners are desirable for applications in which space is limited. Also, simple fasteners with fewer parts are usually more reliable.

Also, the existing fasteners of this general type must be driven (such as by a wrench) from one particular side of the fastener, which severely limits the range of applications.

The invention of this application is an improvement to the invention disclosed in copending and commonly owned U.S. patent application Ser. No. 08/959,569 (the '569 application), filed on Oct. 28, 1997. Although the invention of the '569 application was a significant improvement over the then-existing prior art, there remain aspects of that invention that can be improved upon. For example, the current invention is structurally different from the invention in the '569 application. The '569 application describes a drive ring that is used to drive a stud into contact with a second object. The current invention uses a retaining cover, which retains the stud in a disengaged position. The stud in the current invention is pushed into contact with a second object by a spring.

The structural differences between the current invention and the invention described in the '569 application allow for functional improvements in the current invention. The current invention, because it uses a retaining cover instead of a drive ring, has increased floating capability of the stud. This increased floating capability allows the stud to more easily engage the threads of the second object when the second object is being connected to the first object.

The elimination of the drive ring in the current invention also reduces maintenance. In the current invention, there is little or no maintenance associated with normal use of the fastener. With both the current invention and the previous invention it is important that the stud be able to "free spin" after it is placed in the disengaged position. The stud is screwed into the housing to place it in a disengaged position. If not for the free spinning feature of both inventions, continued rotation of the stud once in the disengaged position would cause the housing to become disengaged from the first object. In the previous invention, the free spinning feature caused excessive wear of the drive ring, which required maintenance to replace the drive ring. In the current invention, the drive ring has been eliminated, thereby eliminating the need for frequent maintenance.

A more in-depth description of the improvements of the current invention over the invention in the '569 application is detailed in the Detailed Description of the Preferred Embodiment of this application.

BRIEF SUMMARY OF THE INVENTION

It is the general object of the present invention to provide a smaller, more compact, lower maintenance self-contained fastener capable of releasably attaching itself to one of two components and capable of releasably securing the two components together. It is also an object of the invention to provide such a self-contained fastener which can be driven from both sides of the fastener.

The present invention provides a fastener device with a cylindrical housing, an embodiment of which has threads located on its exterior surface for releasably securing the housing to one of the two objects being fastened. Inside the housing is located a cooperating member which extends in the axial direction of the housing. The cooperating member is movable between an engaged position in which the cooperating member engages the second object and a disengaged position in which the cooperating member does not engage the second object. The cooperating member has a cooperating member stop shoulder opposed to the housing stop shoulder and adapted to mate with the housing stop shoulder when the cooperating member is in the engaged position. When the cooperating member is in the engaged position, the cooperating member can retain the second object at a selected position with respect to the first object. The second object can be released by moving the cooperating member from the engaged to the disengaged position.

A retaining cover is located toward a lower end of the housing. A spring is disposed between the retaining cover and the cooperating member stop shoulder. The spring functions to bias the cooperating member into engagement with the second object when the cooperating member is not in the disengaged position. The retaining cover is adapted to engage the cooperating member and serves to retain the cooperating when the cooperating member is in the disengaged position member in the disengaged position.

The above as well as additional objects, features, and advantages will become apparent in the following description.

DETAILED DESCRIPTION OF THE PREFERRED EMBODIMENT

Referring to FIGS. 1–4 in the drawings, the preferred embodiment of a fastener 11 of the present invention is illustrated. A housing 13 houses a cooperating member, or stud 15. Stud 15 extends in the axial direction of housing 13, and is movable between a disengaged position illustrated in FIG. 3 and an engaged position illustrated in FIG. 4.

Figure 5:
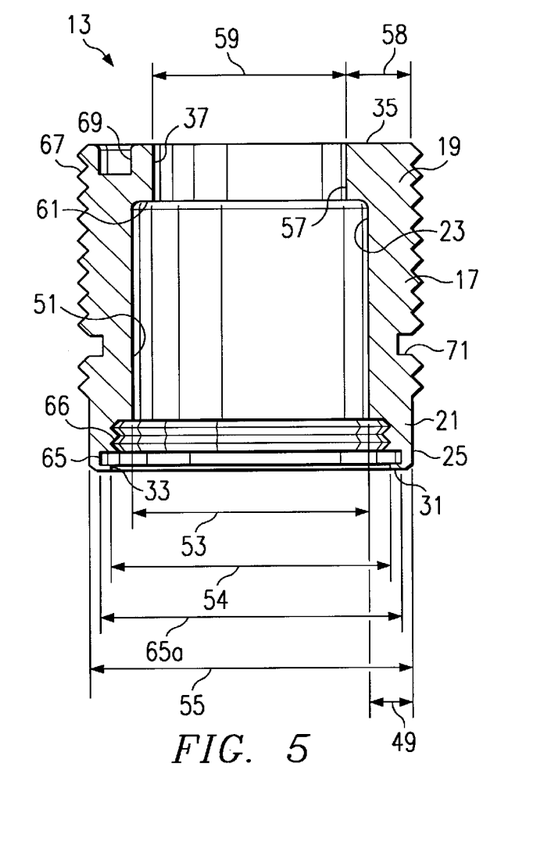
FIG. 5 is a cross-sectional side view of a housing of the fastener of FIG. 1, the cross-sectional view taken at A—A.

Referring now additionally to FIG. 5 in the drawings, housing 13 has an annular wall 17, annular wall 17 including a first, or upper end 19 and a second, or lower end 21. Annular wall 17 is of varying thickness and defines a stepped interior surface 23, an exterior surface 25, a lower annular surface 31, a lower opening 33, an upper annular surface 35, and an upper opening 37. Lower end 21 has a thickness 49 and a lower inner surface 51 having a diameter 53. Lower opening 33 has an aperture diameter 54 that is greater than diameter 53. Exterior surface 25 has an outer diameter 55.

In upper end 19, annular wall 17 protrudes inwardly to reduced diameter inner surface 57, and has an increased wall thickness 58. Reduced diameter inner surface 57 and upper opening 37 both have a diameter 59 which is smaller than diameter 53 of lower inner surface 51. The transition between lower inner surface 51 and reduced diameter inner surface 57 forms a housing stop shoulder 61.

In lower end 21, and formed into lower inner surface 51, is located a retainer ring groove 65. Retainer ring groove 65 has a diameter 65a. An inner threaded portion 66 is disposed on lower inner surface 51 just above retainer ring groove 65. In the preferred embodiment, a plurality of threads 67 is disposed on the exterior surface 25 of housing 13 to allow housing 13 to threadingly engage a threaded hole.

Install tool holes 69 (only one of which is visible in FIGS. 3–5, the others being visible in FIG. 2) are disposed on upper annular surface 35, install tool holes 69 being adapted to receive an install tool, as described in more detail below. A sealing ring groove 71 is circumferentially disposed on exterior surface 25 of housing 13 within the plurality of threads 67. Sealing ring groove 71 is adapted to receive an elastomeric sealing member 73. Although the sealing member 73 could vary in shape and material construction based on the particular application, a typical sealing member is an O-ring of Buna N construction.

Referring now to FIGS. 3–4 and FIGS. 6–8 in the drawings, stud 15 includes a first, or lower end portion 81 and a second, or upper end portion 83. Lower end portion 81 and upper end portion 83 together form an elongate stem 79 with an upper drive surface 87 and a lower drive surface 89. Toward lower end portion 81 of stud 15 is an enlarged portion 85. Upper stud threads 93 are disposed on elongate stem 79 above enlarged portion 85. Located between upper stud threads 93 and enlarged portion 85 is an upper thread relief section 97 that has no threads. Upper stud threads 93 have a maximum diameter 99 which is smaller than the diameter 59 of upper opening 37. Upper thread relief section 97 has a diameter 103 which is approximately equal to a minimum diameter 101 of upper stud threads 93.

Figure 6:
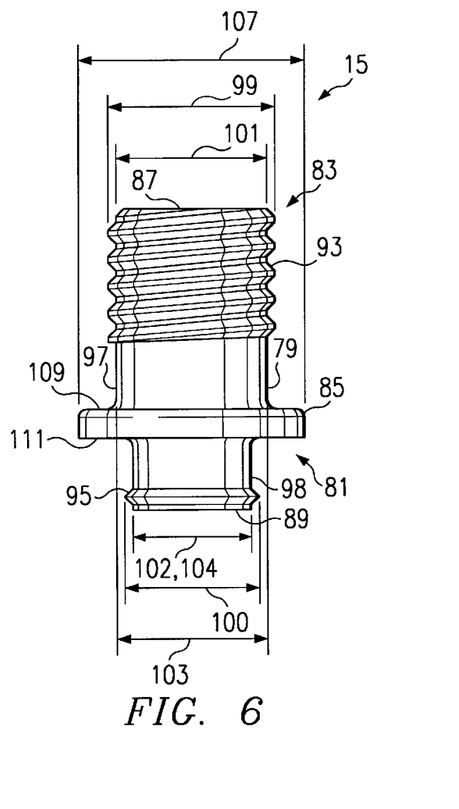
FIG. 6 is a side view of a cooperating member of the fastener of FIG. 1.
Figure 7:
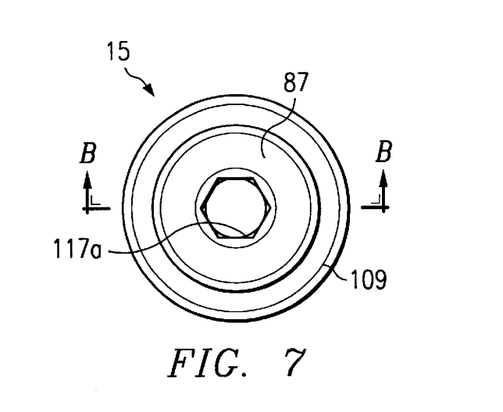
FIG. 7 is a top view of the cooperating member of FIG. 6.
Figure 8:
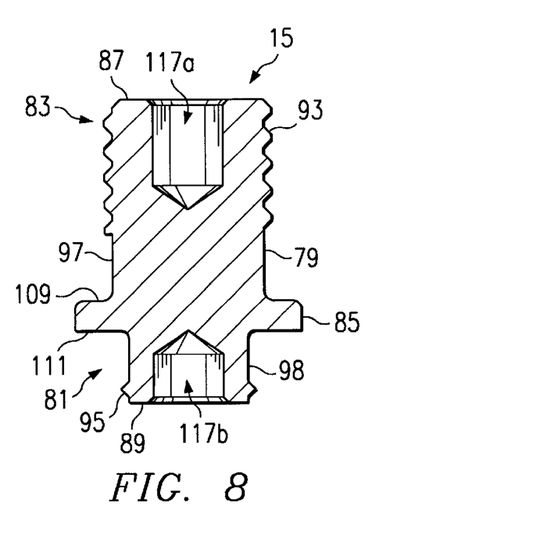
FIG. 8 is cross-sectional side view taken at B—B of the cooperating member of FIG. 6.

Lower stud threads 95 are located on elongate stem 79 below enlarged portion 85. It is preferred that lower stud threads 95 include no more than one or two full threads; however, it is not necessary that the number of threads be limited as such. Located between lower stud threads 95 and enlarged portion 85 is a lower thread relief section 98 that has no threads. Lower stud threads 95 have a maximum diameter 100 which is smaller than diameter 53 of lower inner surface 51. Lower thread relief section 98 has a diameter 104 which is approximately equal to a minimum diameter 102 of lower stud threads 95.

As previously mentioned, enlarged portion 85 is located between upper stud threads 93 and lower stud threads 95. Enlarged portion 85 has an outer diameter 107 which is larger than maximum diameter 99 of upper stud threads 93 and maximum diameter 100 of lower stud threads 95. Outer diameter 107 of enlarged portion 85 is also larger than diameter 59 of upper opening 37, yet is smaller than diameter 53 of lower inner surface 51. The upper surface of enlarged portion 85 which extends outwardly of upper thread relief section 97 defines an upward facing shoulder, or stud stop shoulder 109. The lower surface of enlarged portion 85 defines a downward facing surface 111.

Located at each end of stud 15 are hexagonal recesses, or drive recesses 117a and 117b. Drive recesses 117a and 117b are of the conventional type adapted to fit standard hex key wrenches. Drive recesses 117a and 117b are used to apply torque to stud 15, as explained in more detail below.

Referring now to FIGS. 3, 4, 9, and 10 in the drawings, retaining cover 127 is illustrated. Retaining cover 127 is a flat metal plate being generally cylindrical in shape. Retaining cover 127 has an outer cover surface 133. Outer retaining threads 137 are disposed on outer cover surface 133. A stud aperture 129 passes axially through retaining cover 127, stud aperture 129 being located concentrically with respect to the cylindrical shape of outer cover surface 133. Stud aperture 129 defines an inner cover surface 131. Inner retaining threads 135 are disposed on inner cover surface 131 of retaining cover 127. Although the number of outer retaining threads 137 and inner retaining threads 135 could vary based on the application, it is preferred that there be no more than two full threads on either outer cover surface 133 or inner cover surface 131.

Figure 9:
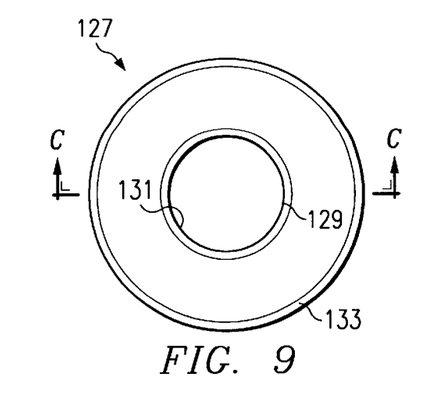
FIG. 9 is a top view of a retaining cover of the fastener of FIG. 1.
Figure 10:
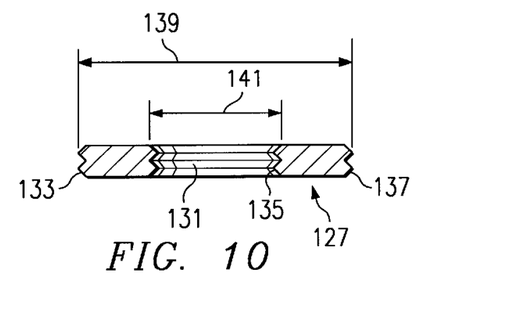
FIG. 10 is a cross-sectional side view taken at C—C of the retaining cover of FIG. 9.

Retaining cover 127 has an outer diameter 139 defined by outer cover surface 133 and an inner diameter 141 defined by inner cover surface 131. Inner diameter 141 is slightly larger than maximum diameter 100 of lower stud threads 95. Inner retaining threads 135 of retaining cover 127 are adapted to threadingly engage lower stud threads 95 of stud 15. Outer retaining threads 137 of retaining cover 127 are adapted to threadingly engage inner threaded portion 66 of housing 13.

Figure 1:
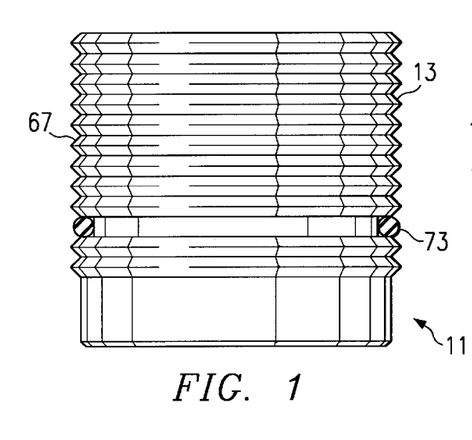
FIG. 1 is a side view of a fastener according to the present invention.
Figure 2:
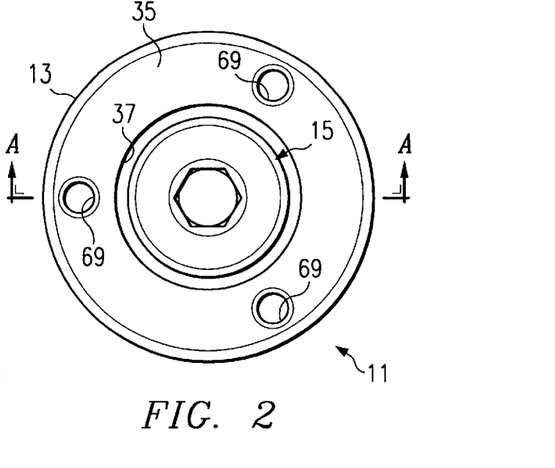
FIG. 2 is a top view of the fastener of FIG. 1.
Figure 3:
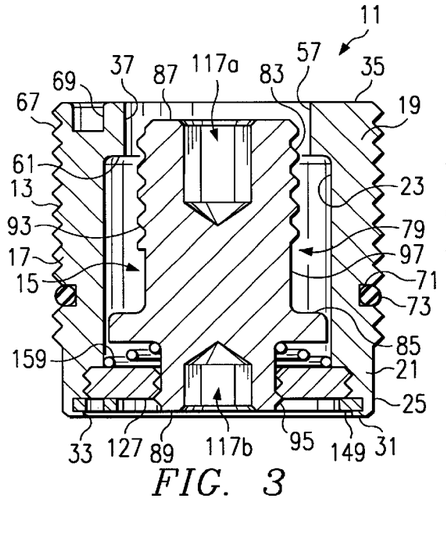
FIG. 3 is a cross-sectional side view taken at A—A of the fastener of FIG. 1, the fastener being shown in a disengaged position.
Figure 4:
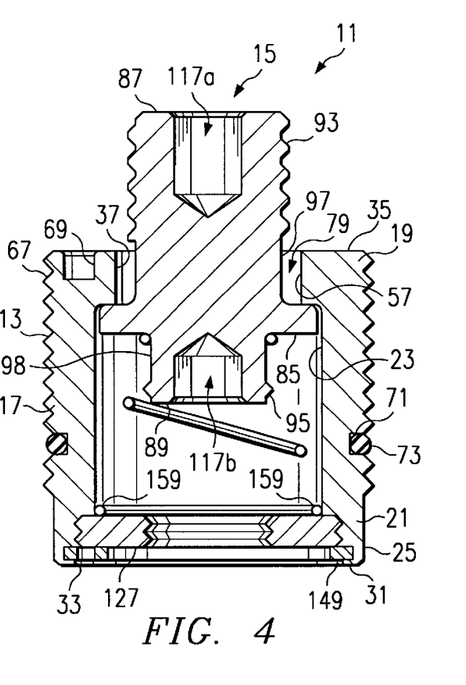
FIG. 4 is a cross-sectional side view taken at A—A of the fastener of FIG. 1, the fastener being shown in an engaged position.
Figure 11:
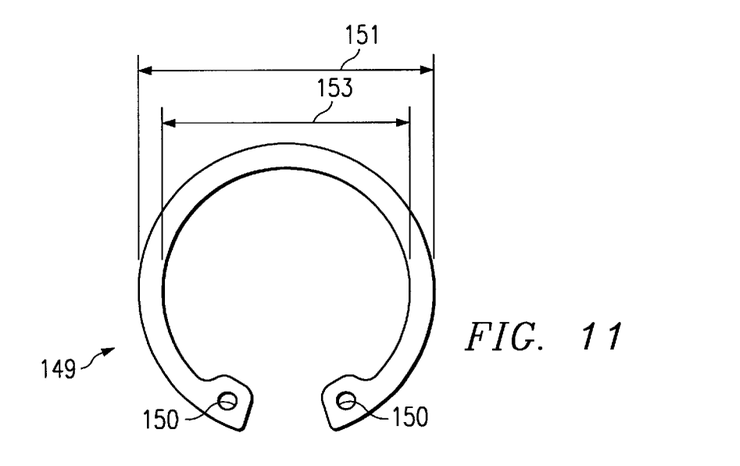
FIG. 11 is a top view of a retainer ring of the fastener of FIG. 1.

Referring now to FIGS. 3, 4, and 11 in the drawings, retainer ring 149 is illustrated. Retainer ring 149 is a flat, thin metal ring adapted to fit within retainer ring groove 65 in housing 13. Apertures 150 facilitate the placement of retainer ring 149 within retainer ring groove 65. In a not-installed position, retainer ring 149 has an outer diameter 151 slightly larger than diameter 65a of retainer ring groove 65. However, when retainer ring 149 is placed in retainer ring groove 65, its outer diameter is reduced to just smaller than diameter 65a of retainer ring groove 65. Retainer ring 149 has an inner diameter 153 which is smaller than outer diameter 139 of retaining cover 127. Thus, retainer ring 149 serves to retain retaining cover 127 within housing 13.

Referring now to FIGS. 3 and 4 in the drawings, when fastener 11 is assembled, a spring 159 is placed between retaining cover 127 and downward facing surface 111 of stud 15. Spring 159 acts to bias stud 15 in an upward direction, away from retaining cover 127. When stud 15 is in the fully disengaged, or retracted position, spring 159 is in its most compressed state (see FIG. 3). When stud 15 is in the fully engaged, or extended position, spring 159 is in its least compressed state (see FIG. 4).

Figure 12:
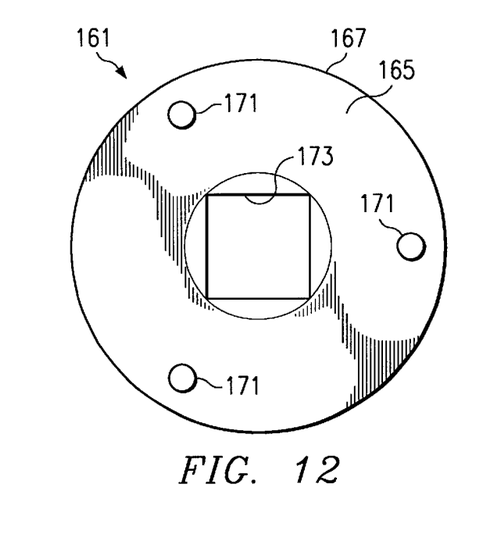
FIG. 12 is a top view of an install tool for installing the fastener of FIG. 1.
Figure 13:
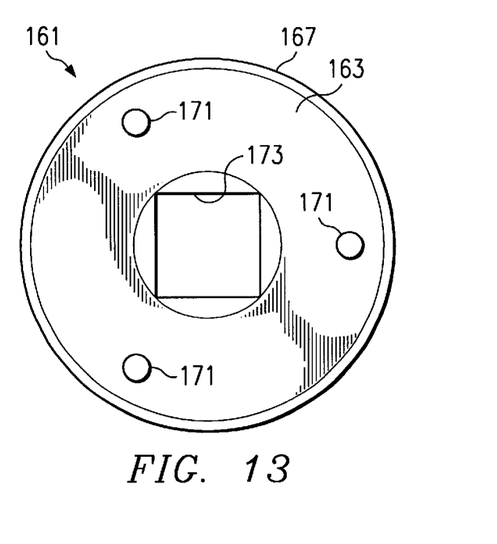
FIG. 13 is a bottom view of the install tool of FIG. 12.
Figures 14, 15:
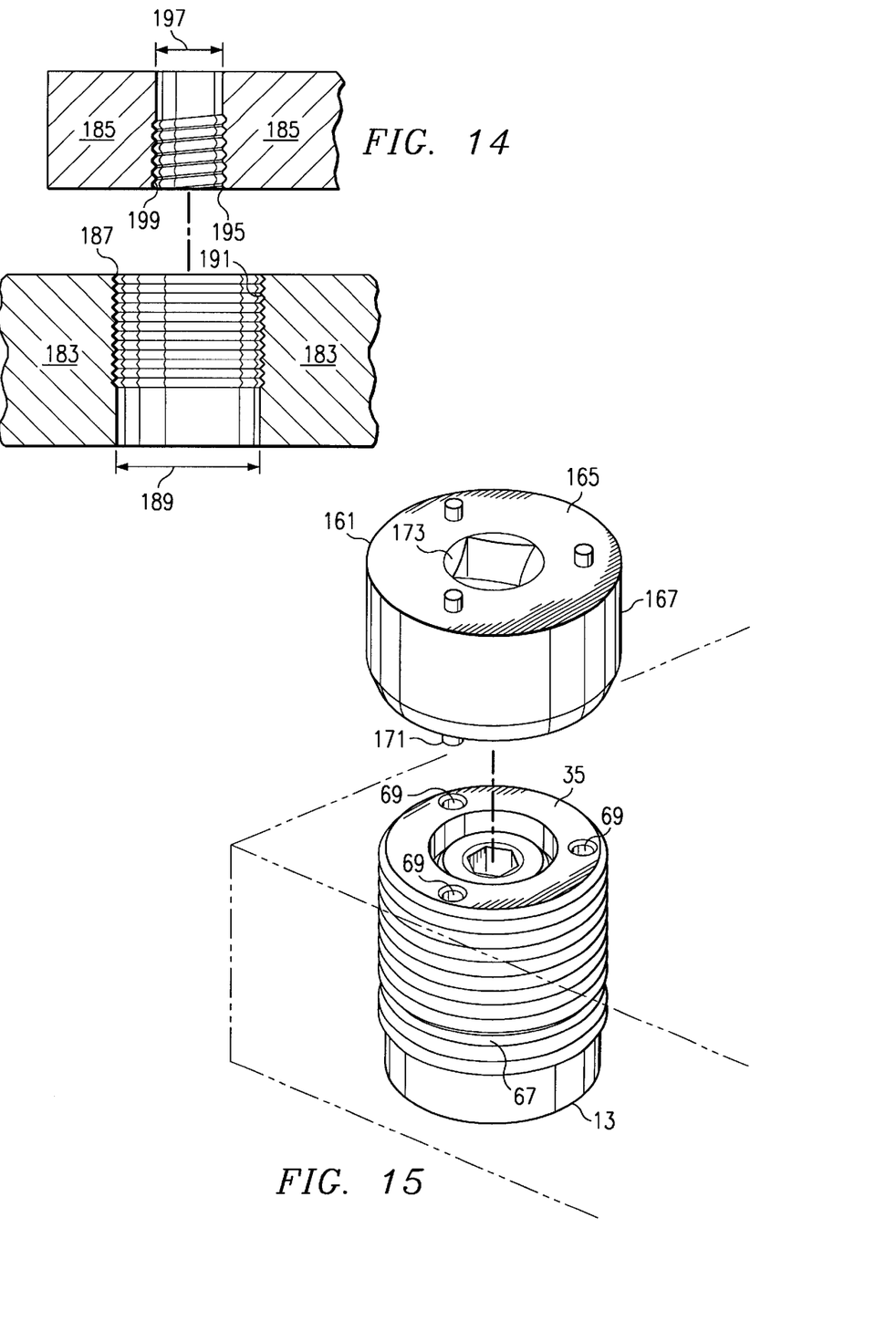
FIG. 14 is a cross-sectional side view of a first object and a second object capable of being releasably fastened by the fastener of FIG. 1.
FIG. 15 a perspective view showing the installation of the fastener of FIG. 1 into the first object of FIG. 14 using the install tool of FIG. 12.

Referring now primarily to FIGS. 12 and 13, but also to FIG. 15 in the drawings, an install tool 161 is illustrated. Install tool 161 is a generally cylindrical tool of diameter approximately equal to outer diameter 55 of housing 13. Install tool 161 has a lower surface 163, an upper surface 165, and an outer cylindrical surface 167. Located on each of lower surface 163 and upper surface 165 are three drive pins 171. Drive pins 171 register with install tool holes 69 located on upper annular surface 35 of housing 13. A square recess 173 passes through the center of install tool 161. Square recess 173 is configured to accept a standard socket wrench drive pin, and is used to tighten housing 13 into the receiving object. Outer cylindrical surface 167 of install tool 161 is knurled to facilitate the application of torque to install tool 161 by hand.

Referring now to FIGS. 14, 15, 16A, and 16B in the drawings, the use of fastener 11 is illustrated. Referring first primarily to FIG. 14, before installing fastener 11, a first object 183 and a second object 185, which will be fastened together, must be prepared. A hole 187 of diameter 189 is drilled into first object 183. Diameter 189 is slightly larger than outer diameter 55 of housing 13. Hole 187 is then milled or tapped to create threads 191, whose minor diameter is approximately equal to diameter 189. Threads 191 are adapted to mate with plurality of threads 67 on housing 13.

A hole 195 is then drilled into second object 185. Hole 195 has a diameter 197 slightly larger than minimum diameter 101 of upper stud threads 93 of stud 15 (see FIG. 6). Hole 195 is then tapped to create threads 199, threads 199 having a minor diameter approximately equal to diameter 197. Threads 199 are adapted to mate with upper stud threads 93 of stud 15.

Figure 16A:
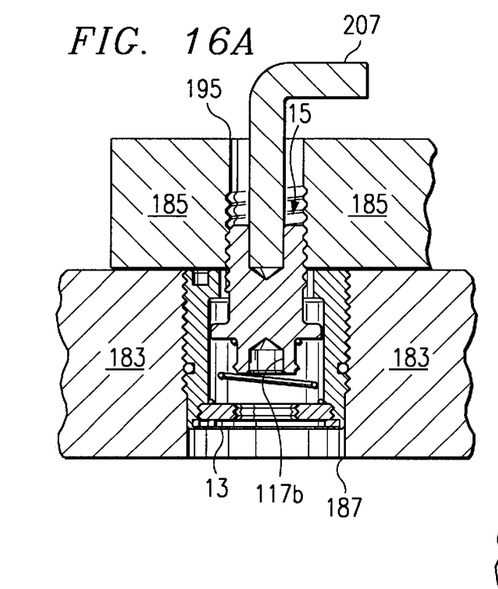
FIGS. 16A and 16B are cross-sectional side views showing the operation of the fastener of FIG. 1, the fastener being used to releasably fasten the first and second objects of FIG. 14.
Figure 16B:
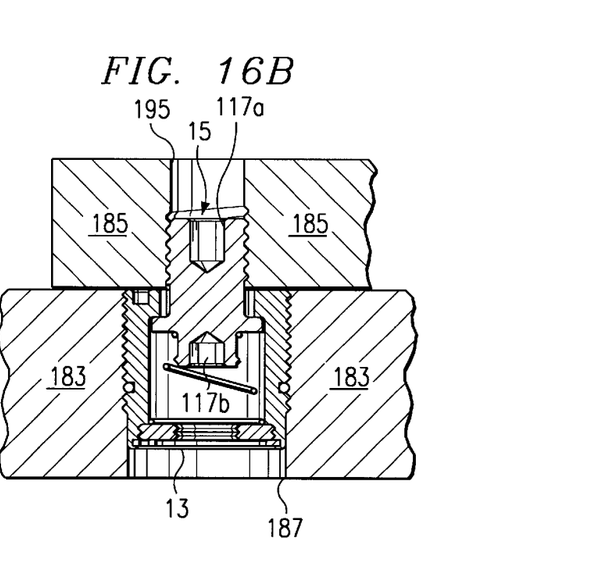

Referring next to FIGS. 15, 16A, and 16B in the drawings, the installation of fastener 11 is illustrated. Fastener 11 is hand threaded into hole 187 of first object 183. Install tool 161 is placed over housing 13 such that drive pins 171 of install tool 161 are aligned and inserted into install tool holes 69 of housing 13. Install tool 161 is then used to tighten fastener 11 by hand. A wrench is then used to apply additional torque to the install tool 161, thereby securely tightening housing 13 of fastener 11 into first object 183. As the housing 13 is tightened into first object 183, the elastomeric sealing member (not shown) seated in sealing ring groove 71 of housing 13 ensures a secure connection between housing 13 and first object 183. The elastomeric sealing member could also be used to provide an "airtight" seal in vacuum applications.

After securing housing 13 in first object 183, second object 185 is lowered toward first object 183 so that hole 195 of second object 185 is aligned with hole 187 of first object 183. A hex key 207 is inserted either through hole 195 or hole 187 and into either drive recess 117a or 117b. If the hex key 207 is inserted through hole 195 into drive recess 117a (as shown in FIG. 16A), hex key 207 is then rotated counter-clockwise as viewed from above housing 13. As hex key 207 is rotated, lower stud threads 95 of stud 15 engage inner retaining threads 135 of retaining cover 127. The counter-clockwise rotation of stud 15 and engagement between lower stud threads 95 and inner retaining threads 135 cause stud 15 to move upwards until lower stud threads 95 no longer engage inner retaining threads 135.

During the initial counter-clockwise rotation of stud 15 (when lower stud threads 95 and inner retaining threads 135 are engaged), spring 159 is in a compressed position (see FIG. 3). When lower stud threads 95 and inner retaining threads 135 become disengaged, spring 159 biases stud 15 upwards until upper end portion 83 of stud 15 contacts second object 185. After contact is made between upper end portion 83 and second object 185, hex key 207 is again used to rotate stud 15 counter-clockwise. The rotation of stud 15 combined with the upward biasing force of spring 159 allows upper stud threads 93 of stud 15 to threadingly engage threads 199 of second object 185. Continued rotation of stud 15 advances stud 15 upwards until stud stop shoulder 109 of stud 15 mates with housing stop shoulder 61 of housing 13. As hex key 207 tightens stud 15, the interaction of upper stud threads 93 and threads 199 tends to pull stud 15 upward and second object 185 downward, thereby increasing the force between stud stop shoulder 109 and housing stop shoulder 61 and tightening second object 185 to first object 183. When first object 183 and second object 185 are securely attached, the fastener is in a fully engaged (or extended) position (see FIG. 16B).

In the installation process just described, hex key 207 is inserted through hole 195 into drive recess 117a (see FIG. 16A). Although FIG. 16A shows hole 187 passing entirely through first object 183, it is not necessary for the hole in first object 183 to be a through hole as long as hex key 207 is inserted into drive recess 117a.

An alternative installation process would involve installing the housing 13 in first object 183 as described previously. Hex key 207 is then inserted through hole 187 into drive recess 117b (this installation method is not shown). Hex key 207 is then rotated clockwise (as seen from below housing 13). The clockwise rotation of stud 15 from below housing 13 accomplishes the same purpose and has the same effect as the counter-clockwise rotation of stud 15 from above housing 13. By inserting hex key 207 into drive recess 117b and by rotating stud 15 from below housing 13, it is no longer necessary for hole 195 in second object 185 to pass entirely through second object 185.

Figure 17:
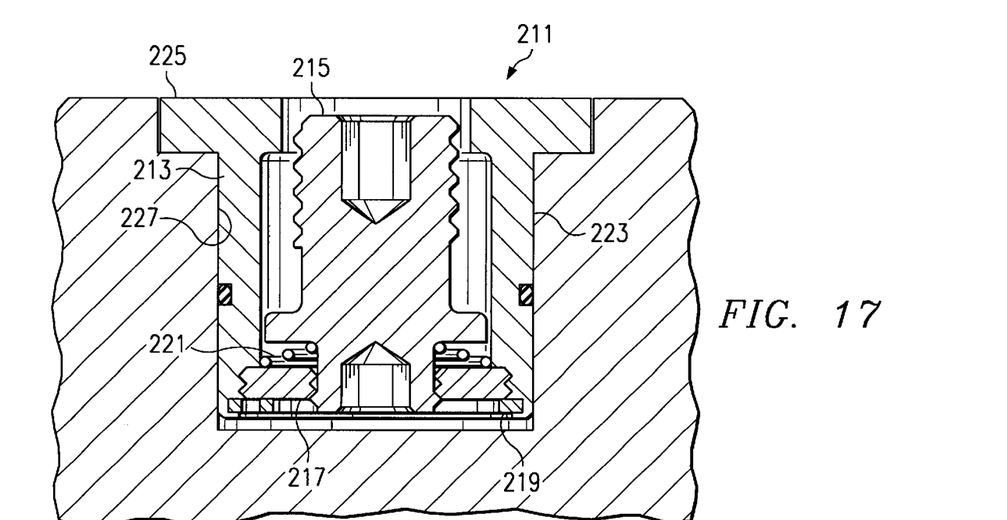
FIG. 17 is a cross-sectional side view of another embodiment of the fastener according to the present invention.

Referring now to FIG. 17 in the drawings, another embodiment of the present invention is illustrated. A possible application of this embodiment would be in resin transfer molds. A fastener 211 has a housing 213 and a stud 215. Stud 215 is identical in form and function to stud 15 of FIGS. 3, 4, 6, 7, 8, 16A, and 16B. Fastener 211 has a retaining cover 217 that engages the threads of stud 215, a retainer ring 219, and a spring 221, amongst other similar components to fastener 11 of FIGS. 3 and 4. The distinguishing features of fastener 211 from fastener 11 are the threadless outer surface 223 of housing 213, and the flange 225 protruding from outer surface 223. The diameter of outer surface 223 is such that fastener 211 can be press fit into hole 227.

The invention of this application is an improvement to the invention disclosed in copending and commonly owned U.S. patent application Ser. No. 08/959,569, filed on Oct. 28, 1997. However, there are significant differences between the two inventions. The most obvious differences are structural. The invention disclosed in the '569 application (the "previous invention") uses a drive ring to move the stud into an engaged or disengaged position. The drive ring is located at the upper end of the housing. This location of the drive ring requires that a separate spring retainer be used at the lower end of the housing to retain a spring, the sole function of the spring being to bias the stud into contact with the drive ring (the drive ring actually accomplishes the task of moving the stud into connection with the second object).

The invention described in the current application (the "current invention") is structurally different from the previous invention. The current invention utilizes a retaining cover to hold the stud in its fully retracted position. The stud is located at the lower end of the housing; this is different than the drive ring of the previous invention, which is located at the upper end of the housing. Because the retaining cover is located at the lower end of the housing, it also serves as a spring retainer, eliminating the need for an extra part.

The physical structure of the drive ring used in the previous invention is different from the retaining cover used in the current invention. The drive ring used in the previous invention was a thin, flat metal ring that fit in a groove formed in the housing. The drive ring included three "tangs" oriented at different angles; the tangs served to drive the stud up or down. The retaining cover of the current invention is a flat metal plate that includes threads on its interior and exterior annular surfaces. Not only is the retaining cover more securely fastened within the housing, it more effectively pulls the stud into a disengaged position.

The current invention is functionally different than the previous invention. As previously mentioned, the previous invention uses a spring to bias the stud into engagement with the drive ring that is located toward the upper end of the housing. As the stud is continually rotated, the stud threads engage the drive ring, causing the stud to move upward. As the stud travels upward, the stud engages the threads of the second object. The threads on the stud are continuously engaged by both the drive ring and the threads of the second object until the stud nears its fully extended position. At the fully extended position, the drive ring no longer engages the threads on the stud.

The current invention utilizes a retaining cover to hold the stud in its fully retracted position. The retaining cover is located at the lower end of the housing. A primary advantage of eliminating the drive ring of the previous invention is the increased floating capability of the stud. In the current invention, when the inner retaining threads of the retaining cover become disengaged from the lower stud threads, the stud is forced upward by the spring. However, as the stud moves upward to engage the second object, the stud is adapted to "float" or move transversely to the upward axial movement of the stud. The ability of the stud to float allows the stud to more easily engage the threads of the second object when the hole of the second object is slightly misaligned from the hole of the first object.

Another advantage of the current invention is reduced maintenance of the fastener. The current invention has little or no maintenance associated with normal use of the fastener. In both the current invention and the previous invention it is imperative that the stud be able to "free spin" after it is placed in the disengaged position. The stud is screwed into the housing to place it in a disengaged position. If not for the free spinning feature of both inventions, continued rotation of the stud once in the disengaged position would cause the housing to become disengaged from the first object. The free spinning feature in the previous invention caused excessive wear of the drive ring, which required maintenance to replace the drive ring. In the current invention, the drive ring has been eliminated, thereby eliminating the need for frequent maintenance.

It should be apparent from the foregoing that an invention having significant advantages has been provided. While the invention is shown in only one of its forms, it is not just limited but is susceptible to various changes and modifications without departing from the spirit thereof.

I claim:

1. A fastener device for releasably fastening a first and second object, the fastener device comprising:

a unitary housing having an annular wall and opposing first and second ends, the annular wall having an exterior surface and an interior surface, the exterior surface having threads adapted for threadingly connecting to a threaded hole in the first object;

the annular wall defining an opening at each opposing end, the annular wall having an inner threaded portion disposed on the interior surface of the annular wall toward the second end of the housing;

a housing stop shoulder extending radially inward from the unitary housing;

a retaining cover located toward the second end of the housing and extending radially inward from the interior surface of the housing, the retaining cover being generally circular in shape and having a stud aperture, the stud aperture defining an inner cover surface, a plurality of inner retaining threads disposed on the inner cover surface, the retaining cover having an outer cover surface, a plurality of outer retaining threads disposed on the outer cover surface;

the plurality of outer retaining threads of the retaining cover threadedly connected to the inner threaded portion of the annular wall;

a stud located within the housing and extending in the axial direction of the housing and having opposing first and second end-portions, the stud being movable between an engaged position in which the stud is adapted to engage the second object and a disengaged position in which the stud is not adapted to engage the second object;

the stud having an enlarged portion toward the first end-portion of the stud and having formed therein a stud stop shoulder, the stud stop shoulder being opposed to the housing stop shoulder and adapted to mate therewith when the stud is in the engaged position;

upper stud threads located toward the second end-portion of the stud, the upper stud threads being adapted to engage the second object;

lower stud threads located toward the first end-portion of the stud, the lower stud threads adapted to threadingly engage the plurality of inner retaining threads of the retaining cover; and at least one drive surface located on the stud.

2. The apparatus according to claim 1 further comprising:

a retainer ring groove formed in the circumference of the interior surface of the housing at the second end of the housing; and a retainer ring located within the retainer ring groove and extending radially inward from the interior surface of the housing, the retainer ring being adapted to retain the retaining cover within the housing thereby retaining the stud within the housing when the stud is in the disengaged position.

3. The apparatus according to claim 1 further comprising:

a spring located between the enlarged portion of the stud and the retaining cover, wherein the spring biases the stud toward the engaged position.

4. The apparatus according to claim 1 further comprising:

install tool holes located on the first end of the housing; and an install tool having a body and pins extending from the body and adapted to register with the install tool holes of the housing, wherein the install tool facilitates installation of the fastener.

5. The apparatus according to claim 1 further comprising:

a sealing ring groove disposed circumferentially in the exterior surface of the housing; and a sealing ring disposed in the sealing ring groove.

6. The apparatus according to claim 5, wherein the sealing ring is made of an elastomeric material.

7. The apparatus according to claim 1, wherein the at least one drive surface comprises a drive recess.

8. The apparatus according to claim 1, wherein two drive surfaces are located on the stud, each drive surface having a drive recess.

9. A fastener device for releasably fastening a first and second object, the fastener device comprising:

a unitary housing having an annular wall and opposing first and second ends, the annular wall having an interior surface and a smooth cylindrical exterior surface adapted to be press fit within a hole in the first object;

the annular wall defining an opening at each opposing end, the annular wall having an inner threaded portion disposed on the interior surface of the annular wall toward the second end of the housing;

a housing stop shoulder extending radially inward from the cylindrical housing;

a retaining cover located toward the second end of the housing and extending radially inward from the interior surface of the housing, the retaining cover being generally circular in shape and having a stud aperture, the stud aperture defining an inner cover surface, a plurality of inner retaining threads disposed on the inner cover surface, the retaining cover having an outer cover surface, a plurality of outer retaining threads disposed on the outer cover surface;

the plurality of outer retaining threads of the retaining cover threadedly connected to the inner threaded portion of the annular wall;

a stud located within the housing and extending in the axial direction of the housing and having opposing first and second end-portions, the stud being movable between an engaged position in which the stud is adapted to engage the second object and a disengaged position in which the stud is not adapted to engage the second object;

the stud having an enlarged portion toward the first end-portion of the stud and having formed therein a stud stop shoulder, the stud stop shoulder being opposed to the housing stop shoulder and adapted to mate therewith when the stud is in the engaged position;

upper stud threads located toward the second end-portion of the stud, the upper stud threads being adapted to engage the second object;

lower stud threads located toward the first end-portion of the stud, the lower stud threads adapted to threadingly engage the plurality of inner retaining threads of the retaining cover; and at least one drive surface located on the stud.

10. The apparatus according to claim 9 further comprising:

a retainer ring groove formed in the circumference of the interior surface of the housing at the second end of the housing; and a retainer ring located within the retainer ring groove and extending radially inward from the interior surface of the housing and adapted to retain the retaining cover within the housing thereby retaining the stud within the housing when the stud is in the disengaged position.

11. The apparatus according to claim 9 further comprising:

a spring located between the enlarged portion of the stud and the retaining cover, wherein the spring biases the stud toward the engaged position.

12. The apparatus according to claim 9 further comprising:

install tool holes located on the first end of the housing; and an install tool having a body and pins extending from the body and adapted to register with the install tool holes of the housing, wherein the install tool facilitates installation of the fastener.

13. The apparatus according to claim 9 further comprising:

a sealing ring groove disposed circumferentially in the exterior surface of the housing; and a sealing ring located in the sealing ring groove.

14. The apparatus according to claim 9, wherein the at least one drive surface comprises a drive recess.

15. The apparatus according to claim 9, wherein two drive surfaces are located on the stud, each drive surface having a drive recess.

16. A fastener device for releasably fastening a first and second object, the fastener device comprising:

a unitary housing having an annular wall and opposing first and second ends, the annular wall having an exterior surface and an interior surface, the annular wall adapted to engage a hole in the first object, the annular wall defining an opening at each opposing end;

a housing stop shoulder extending radially inward from the unitary housing;

a retaining cover located toward the second end of the housing and extending radially inward from the interior surface of the housing, the retaining cover being generally circular in shape and having a stud aperture;

the retaining cover adapted to engage the interior surface of the annular wall toward the second end of the housing;

a stud located within the housing and extending in the axial direction of the housing and having opposing first and second end-portions, the stud being movable between an engaged position in which the stud is adapted to engage the second object and a disengaged position in which the stud is not adapted to engage the second object;

the stud having an enlarged portion toward the first end-portion of the stud and having formed therein a stud stop shoulder, the stud stop shoulder being opposed to the housing stop shoulder and adapted to mate therewith when the stud is in the engaged position;

the first end-portion of the stud being adapted to engage the retaining cover;

upper stud threads located toward the second end-portion of the stud, the upper stud threads being adapted to engage the second object;

at least one drive surface located on the stud;

a retainer ring groove formed in the circumference of the interior surface of the housing at the second end of the housing; and a retainer ring located within the retainer ring groove and extending radially inward from the interior surface of the housing, the retainer ring being adapted to retain the retaining cover within the housing.

17. A fastener device for releasably fastening a first and second object, the fastener device comprising:

a unitary housing having an annular wall and opposing first and second ends, the annular wall having an exterior surface and an interior surface, the annular wall adapted to engage a hole in the first object, the annular wall defining an opening at each opposing end;

a housing stop shoulder extending radially inward from the unitary housing;

a retaining cover located toward the second end of the housing and extending radially inward from the interior surface of the housing, the retaining cover being generally circular in shape and having a stud aperture;

the retaining cover adapted to engage the interior surface of the annular wall toward the second end of the housing;

a stud located within the housing and extending in the axial direction of the housing and having opposing first and second end-portions, the stud being movable between an engaged position in which the stud is adapted to engage the second object and a disengaged position in which the stud is not adapted to engage the second object;

the stud having an enlarged portion toward the first end-portion of the stud and having formed therein a stud stop shoulder, the stud stop shoulder being opposed to the housing stop shoulder and adapted to mate therewith when the stud is in the engaged position;

the first end-portion of the stud being adapted to engage the retaining cover;

upper stud threads located toward the second end-portion of the stud, the upper stud threads being adapted to engage the second object;

at least one drive surface located on the stud;

install tool holes located on the first end of the housing; and an install tool having a body and pins extending from the body and adapted to register with the install tool holes of the housing, wherein the install tool facilitates installation of the fastener.

18. A fastener device for releasably fastening a first and second object, the fastener device comprising:

a unitary housing having an annular wall and opposing first and second ends, the annular wall having an exterior surface and an interior surface, the annular wall adapted to engage a hole in the first object, the annular wall defining an opening at each opposing end;

a housing stop shoulder extending radially inward from the unitary housing;

a retaining cover located toward the second end of the housing and extending radially inward from the interior surface of the housing, the retaining cover being generally circular in shape and having a stud aperture;

the retaining cover adapted to engage the interior surface of the annular wall toward the second end of the housing;

a stud located within the housing and extending in the axial direction of the housing and having opposing first and second end-portions, the stud being movable between an engaged position in which the stud is adapted to engage the second object and a disengaged position in which the stud is not adapted to engage the second object;

the stud having an enlarged portion toward the first end-portion of the stud and having formed therein a stud stop shoulder, the stud stop shoulder being opposed to the housing stop shoulder and adapted to mate therewith when the stud is in the engaged position;

the first end-portion of the stud being adapted to engage the retaining cover;

upper stud threads located toward the second end-portion of the stud, the upper stud threads being adapted to engage the second object;

at least one drive surface located on the stud;

a sealing ring groove disposed circumferentially in the exterior surface of the housing; and a sealing ring disposed in the sealing ring groove.

19. The apparatus according to claim 18, wherein the sealing ring is made of an elastomeric material.

* * * * *